Patented June 18, 1935

2,005,529

UNITED STATES PATENT OFFICE 2,005,529

ANTHRAQUINONE DERIVATIVE

Oakley M. Bishop and Alexander J. Wuertz, Wilmington, Del., assignors to E. I. du Pont de Nemours & Company, Wilmington, Del., a corporation of Delaware No Drawing. Application May 2, 1930, Serial No. 449,355

11 Claims. (Cl. 260—61)

This invention relates to vat dyes and more particularly to intermediates and dyestuffs of the phenyl-benzanthrone series and derivatives thereof. It especially contemplates compounds of the above mentioned class which are produced from the various beta-phenyl-anthraquinones.

It is possible to produce anthraquinones which are substituted in the beta position with a phenyl group as shown by Elbs and Kaiser (A. 257, 95, 1890) and Scholl and Neovius (Ber. 44, 1075, 1911).

Phenyl-benzanthrones in which the phenyl group is attached to the benz- ring are described in U. S. Patent 1,736,061, of November 19, 1929, to Trautner, Stein & Berliner. The following formula is assigned to the compounds of this patent:

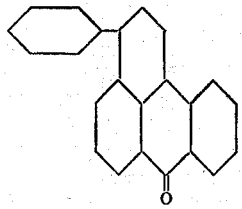

It is an object of this invention to produce a series of new organic compounds. Other objects are to produce new vat dyes, new vat dye intermediates, new di-benzanthrone (violanthrone) compounds, new benzanthrone compounds, to develop new processes for the production of di-benzanthrones, to develop new processes for the production of benzanthrones, and in general to improve the prior art. Other objects will appear hereinafter.

These objects are accomplished by the present invention whereby beta-phenyl-anthraquinones are condensed with sulfuric acid, glycerine and a metallic reducing agent to produce new dyestuff intermediates and whereby the intermediates so produced are condensed in the presence of alcoholic alkali melts to produce new dyestuffs.

The invention will be readily understood from a consideration of the following examples:

Example 1

One hundred (100) parts by weight of para'-chloro-beta-phenyl-anthraquinone are dissolved in 1500 parts of 95–100% sulfuric acid. To this solution is added a sufficient quantity of water to reduce the acidity approximately to 80–83%. The temperature is then raised to 112–115° C. and maintained at this level while 75 to 100 parts of glycerine and 25 to 35 parts of copper powder are added simultaneously and at such a rate that both reagents will be incorporated into the charge in a period of two to three hours. When this has been accomplished the temperature is raised to 118–120° C. and maintained at this point until none of the initial material, para'-chloro-beta-phenyl-anthraquinone, can be detected by means of a microscopic examination or some other of the usual tests. The melt is then diluted by pouring the same into a large volume of water. The precipitate is filtered off, washed until acid-free and then subjected to an alkaline extraction to remove alkaline water-soluble impurities. The product thus obtained consists of a dark greenish-yellow powder which consists of at least three isomeric products, which can be separated by fractional crystallization from alcohol and benzene. One isomeric form is soluble in cold alcohol, another in hot alcohol, and still another in benzene. The recrystallized products are yellow to greenish-yellow compounds having melting points as follows:

(a) Easily soluble product____M. P. 131.8–134.4° C.
(b) Less easily soluble product_____M. P. 102.4–103.6° C.
(c) Benzene soluble product_____M. P. 160 –162 ° C.

Example 2

Another experiment similar to Example 1, was carried out using 100 parts of ortho'-chloro-beta-phenyl-anthraquinone. When treated with similar quantities of sulfuric acid, copper powder and glycerine, under similar conditions, a product which consisted of a number of isomeric chloro-beta-phenyl-benzanthrones was produced. The properties of these compounds were similar to the three isomers described in Example 1, differing, however, in their melting points and solubility in organic solvents.

Example 3

When 100 parts of meta'-chloro-beta-phenyl-anthraquinone are treated, as described in Example 1, with similar quantities of sulfuric acid, copper powder and glycerine, and under corresponding conditions, the resulting product consists of a number of isomeric chloro-beta-phenyl-benzanthrones, the properties of which are similar to the three isomers described in Example 1, but differ in their melting points and solubility in organic solvents.

These intermediate substances may be further condensed to produce dyestuffs of the general formulae:

(1)

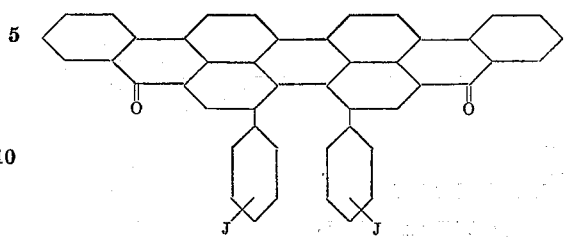

J being a hydrogen, halogen or hydroxyl group.

(2)

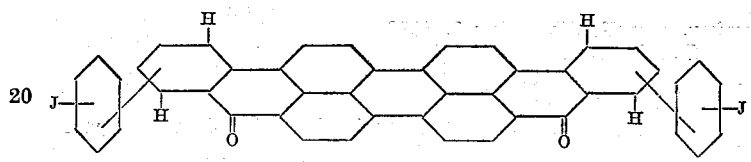

J being a hydrogen, halogen or hydroxyl group. This process will be understood from a consideration of the following example:

*Example 4*

One hundred (100) parts of para'-chloro-beta-phenyl-benzanthrone (see Example 1) were introduced into an alcoholic potash melt (400 parts of KOH+400 parts of ethanol) at 100° C. under good agitation. The temperature was then raised to 140–160° C. and maintained at this level for approximately four hours. Afterwards the melt was poured into a large volume of water. The blue-black dyestuff was subsequently oxidized by aeration, filtered, washed free of alkali and dried. The dried material consists of a dark powder, giving dull greenish-blue sulfuric acid solutions having a brown fluorescence. It dyes from a blue hydrosulfite vat in greenish-blue or steel-blue shades, depending upon which of the several fractional products from Example 1, are used. These new dyestuffs differ from the well-known dibenzanthrone products (violanthrone and isoviolanthrone) in that they tend to give greenish shades rather than dark blue and violet.

The invention is not limited to unsubstituted phenyl-beta-anthraquinones since the phenyl group may be variously substituted as, for instance, by chlorine, or by a hydroxyl group or other halogen group.

The condensation of the beta-phenyl-anthraquinone is not limited to copper as a reducing agent since other metal substances, for example iron and aluminum, may be used. The various isomers of the beta-phenyl-anthraquinone-glycerine condensation will ordinarily be separated and subsequently converted to the dyestuff but the group mixture of isomers obtained (for instance in Example 1) can be treated directly in an alcoholic potash melt to produce a valuable dyestuff material consisting of a mixture of compounds.

The new intermediates are useful in the preparation of new dyestuffs and are useful in preparing colors by oxidation processes since the benz-2-positions are free permitting oxidation to the corresponding oxy-phenyl-dibenzanthrones. The halogen beta-phenyl-benzanthrone and the corresponding dibenzanthrone derivatives are useful in that they are capable of condensation with primary amino compounds. The dyestuffs of this invention are characterized by better shades than present well-known dibenzanthrone colors. For instance the new dyestuffs obtained according to Example 4, when applied to cotton produce much bluer shades than are now known.

As many apparently widely different embodiments of this invention may be made without departing from the spirit and scope thereof, it is to be understood that we do not limit ourselves to the specific embodiments thereof except as defined in the appended patent claims.

We claim:

1. The process which comprises treating about one hundred (100) parts by weight of para'-chloro-beta-phenyl-anthraquinone with about one thousand five hundred (1500) parts of about 95–100% sulfuric acid, reducing the acidity to about 80–83% by the addition of water, raising the temperature to about 112–115° C. and there maintaining it while simultaneously adding about seventy-five to one hundred (75–100) parts of glycerine and about twenty-five to thirty-five (25–35) parts of copper powder over a period of two to three hours, then raising the temperature to about 118–120° C. and maintaining it until the initial anthraquinone derivative has substantially disappeared, afterwards pouring the melt into a large volume of water and separating the precipitate.

2. The product resulting from treating about one hundred (100) parts by weight of para'-chloro-beta-phenyl-anthraquinone with about one thousand five hundred (1500) parts of about 95–100% sulfuric acid, reducing the acidity to about 80–83% by the addition of water, raising the temperature to about 112–115° C. and there maintaining it while simultaneously adding about seventy-five to one hundred (75–100) parts of glycerine and about twenty-five to thirty-five (25–35) parts of copper powder over a period of two to three hours, then raising the temperature to about 118–120° C. and maintaining it until the initial anthraquinone derivative has substantially disappeared, afterwards pouring the melt into a large volume of water and separating the precipitate.

3. The separated isomers of claim 2.

4. The process which comprises reacting a compound of the general formula

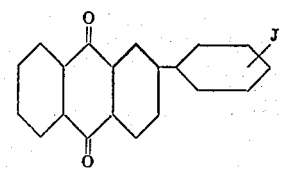

J being hydrogen, halogen, or hydroxyl, with sulfuric acid, glycerine and a metallic reducing agent, whereby to produce a benzanthrone derivative.

5. The product resulting from the process defined in claim 4.

6. The process of producing a beta-phenyl-benzanthrone, which comprises reacting a beta-phenyl-anthraquinone with sulfuric acid, glycerine and a metallic reducing agent.

7. Beta-phenyl-benzanthrones, being substantially identical with the product obtainable according to claim 6.

8. A beta-phenyl-benzanthrone having the phenyl group attached in a beta-position of the anthraquinone nucleus other than position 2, and being characterized by its ability to condense under the influence of alcoholic-potash to give a diphenyl dibenzanthrone.

9. The process of producing a benzanthrone derivative, which comprises reacting a chloro-beta-phenyl-anthraquinone with sulfuric acid, glycerine, and a metallic reducing agent.

10. A chloro-phenyl-benzanthrone containing the chloro-phenyl group in a beta position of the anthraquinone nucleus.

11. The process of producing a beta-phenyl-benzanthrone compound, which comprises heating a beta-phenyl-anthraquinone compound in sulfuric acid while feeding into it simultaneously glycerine and a metallic powder adapted to reduce the anthraquinone nucleus.

OAKLEY M. BISHOP.
ALEXANDER J. WUERTZ.